(No Model.)

5 Sheets—Sheet 1.

W. H. TOMSON.
ICE CREAM FREEZER.

No. 435,333.

Patented Aug. 26, 1890.

Attest:
H. S. Knight
Emma Arthur

Inventor
William Hopkins Tomson
By Knight Bros.
Attys (No Model.)　　　　　　　　　　W. H. TOMSON.　　　　　5 Sheets—Sheet 2.
ICE CREAM FREEZER.
No. 435,333.　　　　　　　　　　　　　　　Patented Aug. 26, 1890.
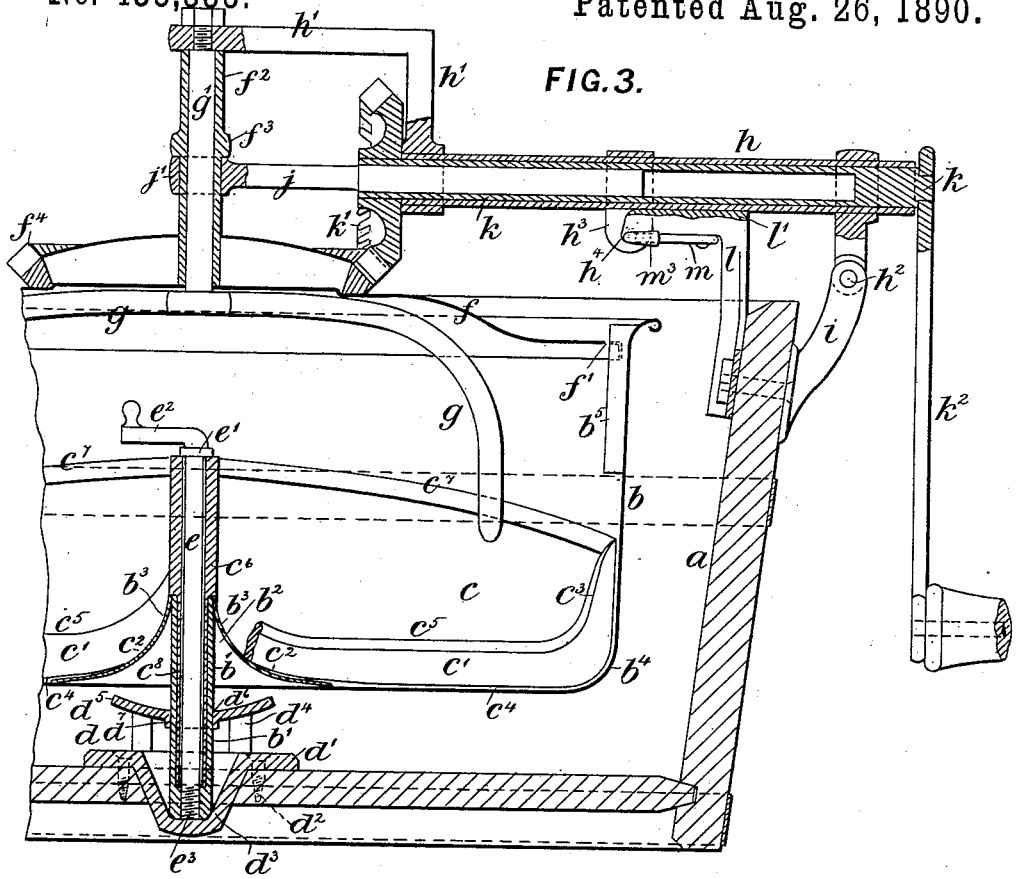
FIG. 3.
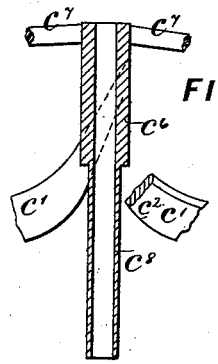
FIG. 6.
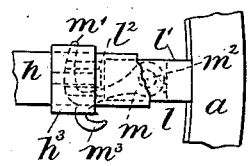
FIG. 8.
FIG. 7.　　FIG. 9.
Attest:
H. S. Knight
Emma Arthur
Inventor
William Hopkins Tomson
By Knight Bros. attys.

(No Model.)  5 Sheets—Sheet 3.
W. H. TOMSON.
ICE CREAM FREEZER.

No. 435,333.  Patented Aug. 26, 1890.

Attest  
H. S. Knight  
Emma Arthur

Inventor  
William Hopkins Tomson  
By Knight Bros.  
Attys (No Model.)

W. H. TOMSON.
ICE CREAM FREEZER.

No. 435,333.

5 Sheets—Sheet 4.

Patented Aug. 26, 1890.

Attest
H. S. Knight
Emma Arthur

Inventor
William Hopkins Tomson
By Knight Bros.
Attys (No Model.) 5 Sheets—Sheet 5.

W. H. TOMSON.
ICE CREAM FREEZER.

No. 435,333. Patented Aug. 26, 1890.

Attest
H. S. Knight
Emma Arthur

Inventor
William Hopkins Tomson
By Knight Bros.
Attys

UNITED STATES PATENT OFFICE.

WILLIAM HOPKINS TOMSON, OF LONDON, ENGLAND.

ICE-CREAM FREEZER.

SPECIFICATION forming part of Letters Patent No. 435,333, dated August 26, 1890.

Application filed March 16, 1888. Serial No. 267,403. (No model.)

*To all whom it may concern:*

Figure 1:
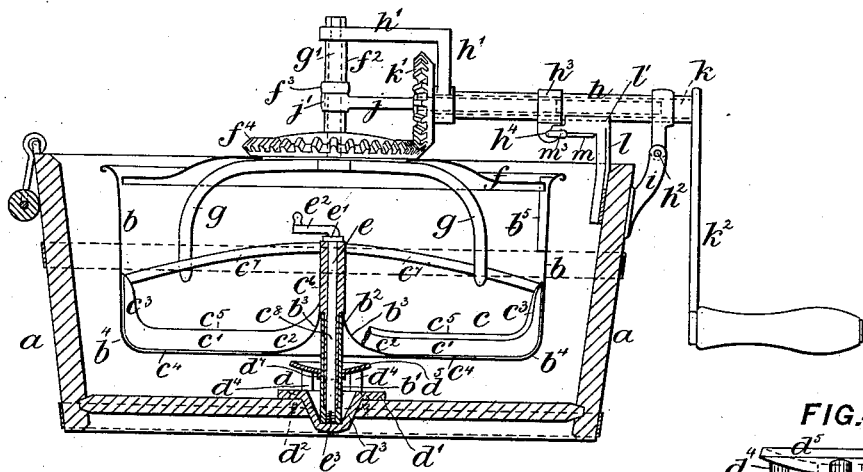
Figure 4:
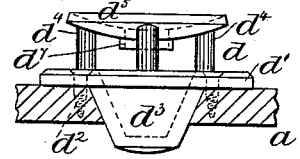
Figure 2:
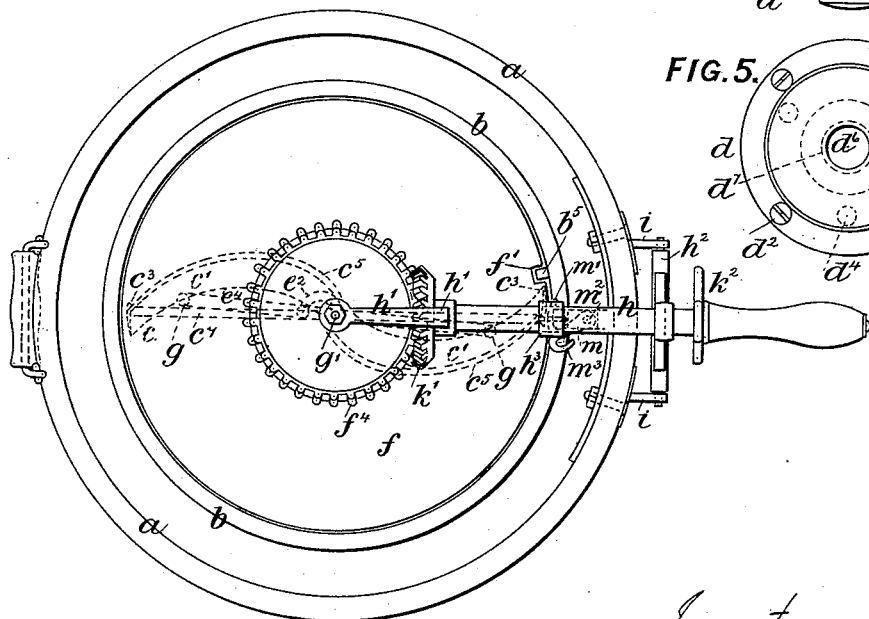
Figure 5:
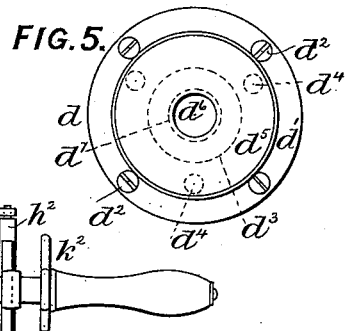
Figure 10:
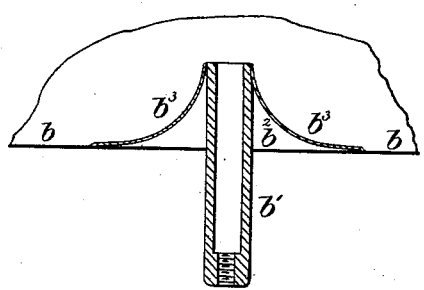
Figure 10:
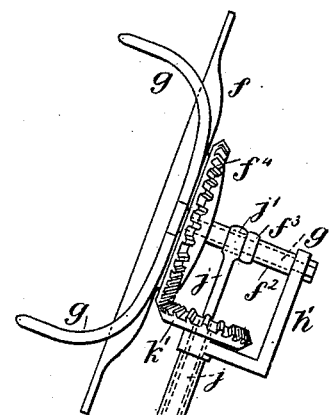
Figure 11:
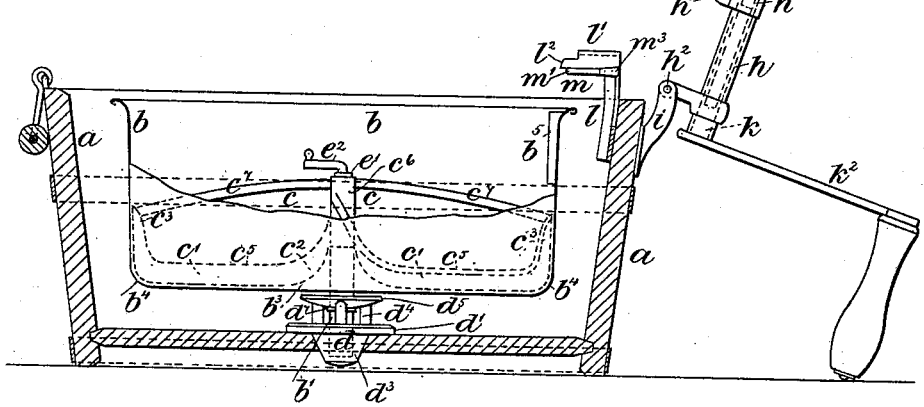
Figure 12:
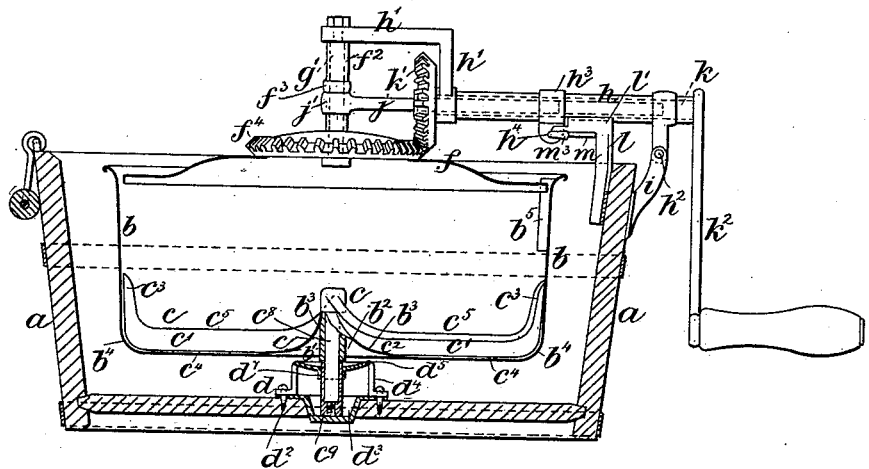
Figure 13:
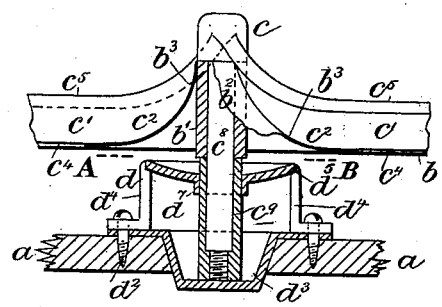
Figure 14:
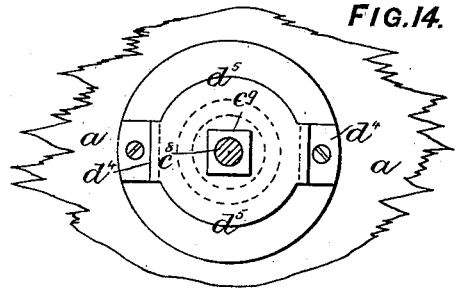
Figure 15:
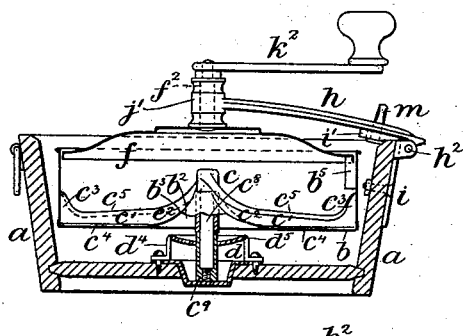
Figure 17:
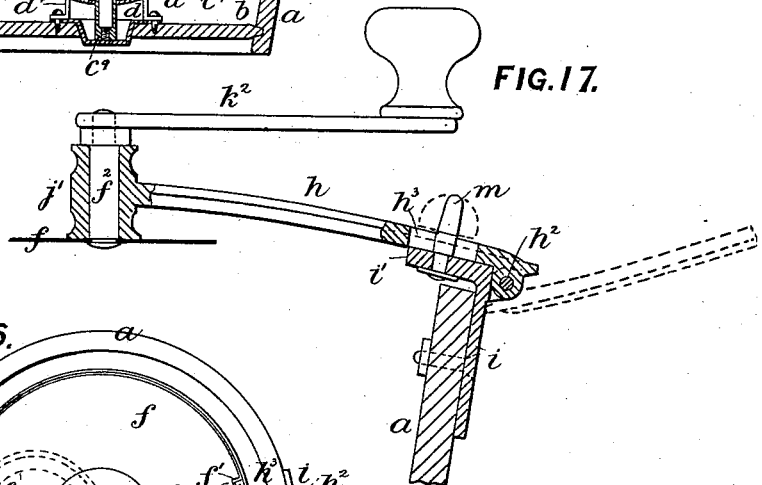
Figure 16:
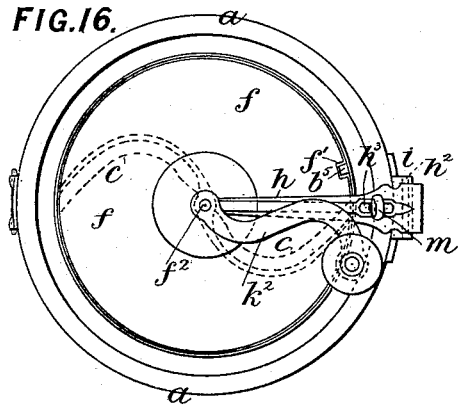
Figure 18:
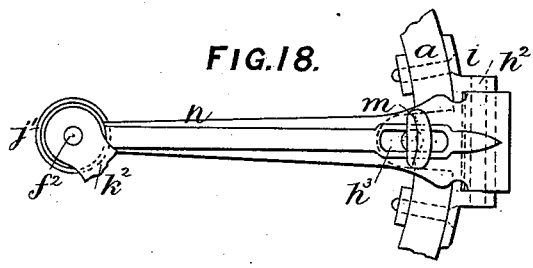

Be it known that I, WILLIAM HOPKINS TOMSON, a subject of the Queen of Great Britain, and managing director of Benham & Froud, (limited,) coppersmiths and art metal-workers, of Chandos Street, Strand, in the county of Middlesex, England, have invented certain new and useful Improvements in Freezers for Ice-Cream and Analogous Substances; and I do hereby declare that the following is a full, clear, and exact description of the invention, which will enable others skilled in the art to which it appertains to make and use the same, reference being had to the drawings hereunto annexed, and to the letters marked thereon— that is to say, Figure 1 is an elevation, partly in section, illustrating a freezer constructed according to my invention. Fig. 2 is a plan, and Fig. 3 is a vertical section, thereof, but with part of the tub and freezing-pan broken away. Fig. 4 is an elevation of the extended bearing for the central hollow spindle of the freezing-pan, and Fig. 5 is a plan thereof. Fig. 6 is a sectional elevation showing the hollow boss of the mixer and its connected parts. Fig. 7 is an end view, partly in section, showing the method of securing the cranked arm in its working position. Fig. 8 is a plan thereof, and Fig. 9 is a similar view with the arm removed and showing the catch or bolt turned back in its unlocked position. Fig. 10 is a detail view showing the mode of connecting the hollow spindle with the freezing-pan; and Fig. 11 is an elevation of the freezer, partly in section, showing the lid turned back, in order to give access to the freezing-pan. Fig. 12 represents an elevation, partly in section, of a freezer fitted with a modified arrangement of parts for holding the mixer or stirrer stationary. Fig. 13 is a sectional elevation of such parts, and Fig. 14 is a horizontal section taken on the line A B of Fig. 13. Fig. 15 is an elevation, partly in section, of a machine similar to that represented at Fig. 12, but showing the crank-handle fitted directly upon the spindle of the lid, and Fig. 16 is a plan thereof. Fig. 17 is a detail view of parts; and Fig. 18 is a plan thereof, the crank-handle being broken off for the sake of clearness.

Like parts are indicated by similar letters of reference in all the figures; but Figs. 3 to 10, and 13, 14, 17, and 18 are drawn to an enlarged scale.

$a$ represents a shallow wooden or other suitable tub or vessel to contain the freezing-mixture. $b$ represents a revolving covered pan or vessel to contain the matter to be frozen, and $c$ represents a fixed mixer or stirrer.

According to the arrangement represented at Figs. 1 to 11, I form the freezing-pan $b$ with a central hollow spindle $b'$, projecting downward from the bottom thereof, and I fix upon the bottom of the tub $a$ an extended footstep, bearing, or socket $d$, into which the spindle $b'$ fits, with capability of rising and falling therein within certain limits and revolving. This bearing or socket has a flaring mouth and is formed of a base or flange $d'$, secured to the tub by screws $d^2$ and provided with a recessed step or socket $d^3$ to receive the hollow spindle $b'$ of the freezing-pan $b$, and such recessed step or socket is formed of larger diameter than such spindle $b'$.

From the base or flange $d'$ of the bearing $d$ several vertical pillars $d^4$ rise, and upon these pillars $d^4$ a cup-shaped collar or flange $d^5$ is supported, such cup $d^5$ being provided with a central hole $d^6$ therethrough, formed with a descending annular guide, flange, or collar $d^7$ around the edge thereof to receive and support the spindle $b'$ of the freezing-pan $b$.

The purpose of the collar $d^5$ is to guide the spindle $b'$ of the freezing-pan $b$ into its bearings when placing it in position in the tub $a$, and the object of the peculiar construction of bearing or socket $d$ is to obtain an extended bearing that will allow of the spindle $b'$ of the freezing-pan engaging therewith when the freezing-pan $b$ is placed in the tub $a$ upon a new charge of freezing-mixture and to permit the freezing-pan $b$ to descend as such freezing-mixture becomes gradually melted, and such extended bearing $d$ has the further advantage that in consequence of its skeleton or open sides formed by the pillars $d^4$ and its recessed step or socket $d^3$ of large diameter it cannot become choked by, but will readily allow of, the spindle $d'$ forming a passage through the freezing-mixture. The upper part of the central hollow spindle $b'$ rises a short distance above the bottom of the freezing-pan $b$ upon the inside thereof, and the bottom of the pan $b$ is, by a separate conical or tapered protuberance $b^2$ solidly connected thereto and to the hollow spindle $b'$, caused to assume a curved or rounded form $b^3$ at that part, and the interior of the pan at its outer bottom edge is also of rounded or concave form $b^4$.

The mixer or stirrer $c$, I form with blades or scrapers $c'$, shaped at their inner ends $c^2$ $c^2$ and at their outer ends $c^3$ $c^3$ to fit the rounded or concave form $b^3$ $b^4$ of the bottom of the freezing-pan $b$, and I also curve these blades or scrapers $c'$ in the direction of their length, and incline them from the vertical in such manner that their lower edges $c^4$ travel in advance of their upper edges $c^5$, so that in the revolution of the freezing-pan $b$ the blades or scrapers $c'$ will have a tendency to scrape and lift the matter being frozen from the bottom of the freezing-pan $b$ and to direct it toward the center thereof. These blades or scrapers $c'$ are fixed at their inner ends to the lower part of a central hollow boss $c^6$, and the outer end of each blade or scraper $c'$ is fixed to and supported by the outer end of a tie-bar $c^7$, and the inner ends of these tie-bars $c^7$ are fixed to the upper part of the hollow boss $c^6$. The hollow boss $c^6$ is extended in a downward direction in the form of a hollow spindle $c^8$ of smaller diameter than the hollow boss $c^6$, so that such central hollow boss $c^6$ of the mixer or stirrer $c$ takes a bearing upon the top of the hollow spindle $b'$ of the freezing-pan $b$, and the hollow spindle $c^8$ of the mixer or stirrer $c$ passes down the interior of the hollow spindle $b'$ of the freezing-pan $b$ nearly to the bottom thereof.

The mixer or stirrer $c$ is retained in position by means of a rod $e$, provided with an enlarged head $e'$, which forms an abutment for the hollow boss $c^6$ of the mixer $c$, and a crank-handle $e^2$ at the upper end by which it may be rotated and a worm or thread $e^3$ at the lower end taking into a corresponding thread formed upon the interior of the hollow spindle $b'$ of the freezing-pan $b$. This construction permits the mixer or stirrer $c$ to be readily removed from and replaced in position in the freezing-pan $b$ for cleansing or other purposes, and it also holds the mixer or stirrer $c$ securely in place and prevents it being forced up as the matter under treatment freezes upon the bottom of the pan $b$.

Rotary motion is given to the freezing-pan $b$ through the lid $f$, and with this object I arrange upon the inside of the freezing-pan $b$ one or more vertical feathers $b^5$, and in the lid $f$, which is constructed to fit loosely inside the freezing-pan $b$, I form corresponding notches or ways $f'$, so that the freezing-pan $b$ may rise and fall in relation to the lid $f$, according to the condition of the freezing-mixture which is beneath and around the pan $b$, while both are compelled to revolve together, whatever may be the position of the freezing-pan $b$.

In order to prevent the mixer or stirrer $c$ revolving with the freezing-pan $b$, I employ a fixed fork $g$, projecting downward from the inside of the lid $f$, so as to engage with the tie-bars $c^7$ of the blades or scrapers $c'$ of the mixer $c$ in any position of the freezing-pan $b$. This fork $g$ is connected by a fixed spindle $g'$ to the cranked part $h'$ of an arm $h$, the straight part of which is formed hollow, and is carried by a hinge formed, preferably, of a shaft $h^2$, mounted at each end, with capability of rocking or oscillating in brackets $i$, for the purpose hereinafter explained.

In order to give the required rotary motion to the lid $f$, and thus to the freezing-pan $b$, I carry the lid $f$ by a hollow vertical shaft $f^2$, which embraces and revolves upon the fixed spindle $g'$ of the fork $g$. The hollow shaft $f^2$ has a boss or enlargement $f^3$ formed thereon at about midway of its length, which takes a bearing upon a short tube or collar $j'$, carried by the outer end of a non-rotating spindle $j$, the inner end of which passes into and closely fits a tubular crank-shaft $k$, which revolves within the bore of the arm $h$. A beveled toothed wheel $f^4$ is fixed upon the top of the lid $f$ and is taken into by a similar but smaller wheel $k'$, which revolves around the non-rotating spindle $j$, and is carried and driven by the tubular crank-shaft $k$, passing through and carried by the straight part $h$ of the cranked arm, and said tubular crank-shaft $k$ is provided upon the end thereof with a crank-handle $k^2$, whereby motion may be given to the apparatus. The hollow arm $h$ is carried by a rocking shaft $h^2$, mounted at each end in a bracket $i$, fixed to the tub $a$, as before stated, by means of which it may be readily turned back out of the way, together with the lid $f$ and its connected parts, until it assumes the position of rest, (indicated at Fig. 11,) when access is desired to be had to the freezing-pan $b$ or for other purposes. Any other suitable form of hinge may, however, be employed to connect the arm $h$ with the tub $a$.

When the lid $f$ is in position in the pan $b$, as represented at Figs. 1, 2, and 3, the arm $h$ rests upon a concave seat $l'$ upon a bracket $l$, fixed to the tub $a$, and is there securely held by any suitable locking device. For this purpose, according to the arrangement shown in the drawings, and which is shown more clearly at Figs. 7, 8, and 9, I form the arm $h$ with a downwardly-projecting lug $h^3$, having a hole $h^4$ therethrough, which lug $h^3$ is received into an open-ended slot $l^2$, formed in the nose of the bracket $l$, leaving the hole $h^4$ in such lug $h^3$ exposed beneath the slot $l^2$, where it is engaged by one arm $m'$ of a bolt or catch $m$, mounted with capability of turning upon a center $m^2$ upon the under side of the seat $l'$ of the bracket $l$, and the other arm $m^3$ of the bolt or catch $m$ forms a thumb-piece by which it may be operated.

In the arrangements represented at Figs. 12 to 18, I dispense with the fork $g$ and its connected and coacting parts for holding the mixer or stirrer $c$ stationary, and I form the mixer-spindle $c^8$ solid and with a screw-thread upon its lower end to receive an elongated flat-sided nut or spindle $c^9$, which takes an abutment against the spindle $b'$ of the freezing-pan $b$, and thus retains the mixer or stirrer in position. The cup $d^5$ of the extended bearing or socket $d$ is formed with a square hole therein, corresponding with the shape of the elongated nut or spindle $c^9$, which formation allows of the freezing-pan $b$ rising and falling and revolving, as before explained, but at the same time holds the mixer stationary.

At Figs. 15 to 18 I have shown a slight modification, in which the crank-arm $k^2$ is fixed directly upon the spindle $f^2$ of the lid $f$, the intervening toothed wheels $f^4$ and $k'$ and connected parts being dispensed with. In this arrangement the hinged arm $h$ is formed solid, and is provided at its outer end with a bearing $j'$ for the spindle $f^2$ of the lid $f$, and at its inner end it is formed with a slot $h^3$ therein to receive a turn-button $m$, which is carried by a seat or rest $i'$ for the arm $h$, projecting from the bracket or plate $i$ of the hinge, and serves to hold the arm $h$ in its working position.

The position assumed by the arm $h$ when turned back, together with the lid $f$, is indicated by the dotted lines in Fig. 17.

Having now particularly described and ascertained the nature of my said invention and in what manner the same is to be performed, I declare that what I claim is—

1. In a freezer, the combination, with the tub and the pan, of the bearing in the bottom of said tub, a spindle supporting said pan and resting upon said bearing, and a collar surrounding said spindle at a distance from said bearing for the purpose of allowing such spindle vertical movement without becoming displaced, as set forth.

2. The combination, with the ice-receptacle, of a bearing therein, a flange or collar supported above said bearing, a freezing-pan, a hollow spindle secured to said freezing-pan and resting in said bearing and flange or collar, a hollow boss resting upon said spindle, mixers secured to said boss, and a rod passing through said boss and spindle and securing them together, as set forth.

3. The combination, with the freezing-pan and the ice-receptacle, of the spindle upon which said pan is supported, a bearing or step having a flaring mouth secured in said ice-receptacle, the collar $d^5$, having an opening, through which said spindle passes and rests in said step or bearing, and pillars supporting said cup above said step or bearing, substantially as set forth.

4. The combination, with the freezing-pan and the ice-tub, of the spindle upon which said pan is supported, a bearing or step having a flaring mouth, the flange $d'$ on said bearing secured to the bottom of the tub, the shaped collar $d^5$, having a central opening, through which said spindle passes and rests in said bearing, a depending flange or collar surrounding said opening, and pillars secured to said collar and bearing for supporting the latter, substantially as set forth.

5. In a freezer, the combination, with the pan $b$, having the rounded or concave surfaces $b^3$ $b^4$ in its bottom, and the hollow spindle $b'$, supporting said pan, of the boss $c^6$, supported upon said spindle $b'$ and having the spindle $c^8$ inserted within the spindle $b'$, and the blades $c'$, secured to said boss $c^6$ and shaped at their inner and outer ends to conform to the bottom of said pan and curved in the direction of their length and inclined from the vertical, substantially as set forth.

6. In a freezer, the combination, with the freezing-pan and the tub, of a hollow internally-screw-threaded spindle supporting said pan in said tub, a mixer or stirrer, a hollow boss secured to said mixer or stirrer and supported upon said spindle, and a rod passing through said boss and screwing into said spindle and having the enlarged head $e'$ and a crank-handle, substantially as set forth.

7. In a freezer, the combination, with the freezing-pan, of vertical feathers in said pan on its inner wall and a lid adapted to fit within said pan having notches corresponding to said feathers, as set forth.

8. In a freezer, the combination, with the freezing-pan, the mixer therein, and the tub, of an arm hinged to said tub and projecting over said pan, and the fixed fork $g$, secured to said arm and engaging said mixer, substantially as set forth.

9. In a freezer, the combination, with the tub, the freezing-pan, and mixer therein, of a hollow arm hinged to said tub, the fork $g$, fixed to said arm and engaging said mixer, a shaft extending through said hollow arm, a crank, and a pinion on said shaft, and a gear-wheel on said pan adapted to be engaged by said pinion, substantially as set forth.

10. In a freezer, the combination, with the tub, the pan, and mixer therein, of the hollow arm supported on said tub, the lid $f$, engaging said pan, the fork $g$, engaging said mixer and having a spindle extending through said lid and secured to said arm, a hollow shaft on said spindle supporting said lid, a bevel gear-wheel and the bearing $j'$ on said hollow shaft, the non-rotating spindle $j$, supporting said bearing, and a shaft extending through said hollow arm and having a pinion engaging said gear-wheel and a crank for revolving it, substantially as set forth.

11. In a freezer, the combination, with the lid $f$ and the tub, of the shaft $f^2$, supporting said lid, a hollow arm supported on said tub, the freezing-pan having connection with said lid and containing a stationary stirrer, a gear-wheel on said lid, a hollow crank-shaft inserted through said hollow arm, a pinion on said shaft engaging said gear-wheel, a bearing on shaft $f^2$, and the non-rotary spindle inserted in said hollow crank-shaft and supporting said bearing, substantially as set forth.

12. In a freezer, the combination, with the lid $f$ and the hollow arm $h$, of a tubular crank-shaft $k$, inserted through said hollow arm and provided with a crank, bevel gear-wheels on said crank-shaft and lid, respectively, engaging each other, the shaft $f^2$, supporting said lid, and the spindle $j$, inserted in said tubular crank-shaft and supporting shaft $f^2$, substantially as set forth.

13. In a freezer, the combination, with the arm $h$, hinged at one end for supporting the lid $f$, of a perforated lug on said arm, a bracket having a concave surface for the support of said arm, and a slot for the passage of said lug, and a bolt or catch pivoted to said bracket and having an arm adapted to enter said perforated lug, as set forth.

14. In a freezer, the combination, with a revoluble freezing-pan, a hollow spindle $b'$, supporting said pan, and the tub having the socket $d$ supporting said spindle, of a lid $f$, feather and notch connection between said lid and pan, the hollow arm $h$, the bracket $h'$, the mixer $c$, the rod $e$, for holding said mixer and spindle $b'$ together, the fork $g$, for holding said mixer from turning, the spindle $g'$, supported by the bracket $h'$, the crank-shaft $k$, the shaft $f^2$, connected with said lid and geared to shaft $k$, the bearing $f^3$ on shaft $f^2$, the spindle $j$, inserted in shaft $k$ and resting under said bearing, and a bracket $l$ on the tub supporting said arm $h$, substantially as described.

W. HOPKINS TOMSON.

Witnesses:
B. J. B. MILLS,
B. M. WHITE,
*Both of 23 Southampton Buildings, London.*